(12) United States Patent
Sun

(10) Patent No.: US 8,909,057 B2
(45) Date of Patent: *Dec. 9, 2014

(54) SYSTEM USING FREQUENCY CONVERSIONS FOR SUB-OCTAVE TRANSMISSION OF SIGNALS OVER A FIBER OPTIC

(75) Inventor: Chen-Kuo Sun, Escondido, CA (US)

(73) Assignee: Titan Photonics, Fremont, CA (US)

( * ) Notice: Subject to any disclaimer, the term of this patent is extended or adjusted under 35 U.S.C. 154(b) by 100 days.

This patent is subject to a terminal disclaimer.

(21) Appl. No.: 13/585,653

(22) Filed: Aug. 14, 2012

(65) Prior Publication Data

US 2014/0050484 A1   Feb. 20, 2014

(51) Int. Cl.
*H04B 10/2575* (2013.01)
(52) U.S. Cl.
USPC .......................... 398/116; 398/115; 398/183
(58) Field of Classification Search
CPC ............................ H04B 10/20; H04B 10/2575
USPC ................ 398/115, 116, 183; 385/3; 359/238
See application file for complete search history.

(56) References Cited

U.S. PATENT DOCUMENTS

| | | | |
|---|---|---|---|
| 3,488,586 A | 1/1970 | Watrous | |
| 3,794,841 A | 2/1974 | Cosentino | |
| 5,526,161 A | 6/1996 | Suzuki | |
| 6,353,490 B1 | 3/2002 | Singer | |
| 6,538,789 B2 | 3/2003 | Sun | |
| 2002/0012493 A1* | 1/2002 | Newell et al. | 385/24 |
| 2003/0152386 A1* | 8/2003 | Vohra et al. | 398/76 |
| 2006/0165413 A1* | 7/2006 | Schemmann et al. | 398/71 |
| 2007/0032256 A1 | 2/2007 | Kolze | |
| 2007/0150927 A1 | 6/2007 | Chapman | |
| 2008/0138076 A1* | 6/2008 | Sasai et al. | 398/115 |
| 2009/0047023 A1* | 2/2009 | Pescod et al. | 398/115 |
| 2010/0142955 A1* | 6/2010 | Yu et al. | 398/72 |
| 2012/0230692 A1 | 9/2012 | Sun | |

FOREIGN PATENT DOCUMENTS

| | | |
|---|---|---|
| WO | 0069098 | 11/2000 |
| WO | 2006135139 A1 | 12/2006 |
| WO | 2012122254 A2 | 9/2012 |

* cited by examiner

*Primary Examiner* — David Payne
*Assistant Examiner* — Omar S Ismail
(74) *Attorney, Agent, or Firm* — Nydegger & Associates

(57) ABSTRACT

A system for transporting a plurality of digital signals (i.e. "n" digital signals) over an optical fiber includes a plurality of modems for modulating each digital signal on a respective analog signal. Each resulting RF signal is processed by a corresponding up-convertor, which includes a mixer and local oscillator, to produce a frequency band which can be a double sideband or single sideband of the modulated signal. The resulting frequency bands output by the up-convertors are non-overlapping and are spaced apart within a single sub-octave. An RF combiner combines the frequency bands and the combined RF signal is converted into an optical signal by an optical transmitter that outputs to an optical fiber. An optical receiver converts the optical signal from the fiber to an RF signal that is directed to an RF splitter. Signal fractions from the splitter are filtered, down-converted and demodulated to recover the initial digital signals.

20 Claims, 5 Drawing Sheets

SYSTEM USING FREQUENCY CONVERSIONS FOR SUB-OCTAVE TRANSMISSION OF SIGNALS OVER A FIBER OPTIC

FIELD OF THE INVENTION

The present invention pertains generally to optical systems and methods for transporting digital signals. More particularly, the present invention pertains to systems and methods for simultaneously transporting a plurality of different analog and digital signals, in a sub-octave transmission, over a relatively long optical fiber. The present invention is particularly, but not exclusively, useful for systems and methods that combine a plurality of different digital signals onto a single sub-octave radio-frequency (RF) signal for subsequent conversion to a light beam configured for optical transmission over an optical fiber.

BACKGROUND OF THE INVENTION

With regard to a communications system, a point-to-point connection is a connection in which information is transported between two nodes or endpoints. Modernly, there is a need to transport digitally encoded information such as video, voice and data signals over relatively long distances using a point to point connection. In this regard, optical fibers can be used to transport signals over relatively long distances with relatively low signal distortion or attenuation, as compared with copper wire or co-axial cables.

One way to transport digital information across an optical fiber is to encode the digital signal on an analog signal (e.g. RF signal) using a modem. Next, the RF signal can be converted into a light beam signal using an optical transmitter such as a laser diode, and then introduced into an end of an optical fiber. In this process, more than one light signal can be transmitted at one time. Typically, to accommodate the transport of a large volume of information, a relatively large bandwidth RF signal, having a multi-octave bandwidth, is converted and transmitted over the optical fiber. For these multi-octave optical transmissions, composite second order distortions caused by fiber dispersion can cause significant signal degradation at optical transport distances of about 1 km, or more.

One solution to the limitations associated with composite second order distortions is to use an RF signal having a sub-octave bandwidth. For example, U.S. patent application Ser. No. 12/980,008 for an invention titled "Passive Optical Network with Sub-Octave Transmission," which is owned by the same assignee as the present invention, and which is incorporated herein by reference, discloses that the unwanted second order distortions in a transmitted optical signal can be significantly reduced in a passive optical network when the radio frequency carriers are selected from a sub-octave bandwidth. Further, with a frequency up-conversion for the transmission of signals in a sub-octave band, frequency interferences in multi-wavelength optical transmissions can be avoided.

In light of the above, it is an object of the present invention to provide a system and method for optically transporting a plurality of digital signals over a single optical fiber over distances greater than about 1 km. Another object of the present invention is to provide a system and method for reducing the adverse effects of composite second order distortions during transport of a plurality of digital signals over a point to point communications connection. Still another object of the present invention is to provide a system and method for using frequency conversions for sub-octave transmission of signals over a fiber optic that are easy to use, relatively easy to manufacture, and comparatively cost effective.

SUMMARY OF THE INVENTION

In accordance with the present invention, a system for transporting a plurality of digital signals (i.e. "n" digital signals) over an optical fiber includes one or more modems for modulating each digital signal on a respective analog carrier signal. This results in "n" RF signals, and, typically each RF signal has a substantially same initial carrier frequency band ($F_0$). The system also includes a plurality of up-convertors, with one up-convertor for each of the RF signals.

Functionally, each up-convertor operates on a respective RF signal to output an RF signal having a frequency band including a frequency that is greater than ($F_0$). For example, the first up-convertor operates on a first RF signal to output a frequency band that includes the frequency ($F_1$), the second up-convertor operates on a second RF signal to output a frequency band that includes the frequency ($F_2$), and so on, with the $n^{th}$ up-convertor operating on an $n^{th}$ RF signal to output a frequency band that includes the frequency ($F_n$). Furthermore, for the present invention, each frequency band can include both sidebands (i.e. double sideband (DSB) or only a single sideband (SSB)) of the modulated signal. For example, the single sideband signal may be produced using a suitable filter or a single sideband (SSB) mixer.

For the system, the "n" frequency bands output by the "n" up-convertors (and filters in some cases) are non-overlapping and are spaced apart within a single sub-octave. Thus, all of the frequencies output by the up-convertors reside within a frequency spectrum between $f_L$ and $f_H$, where $2f_L - f_H > 0$. The frequency bands output by the up-convertors are then combined using an RF combiner and the combined signal is directed to an optical transmitter. At the optical transmitter, the combined RF signal is converted into an optical signal, for example, having a wavelength, ($\lambda_1$), that is directed onto an end of an optical fiber.

In more structural detail, each up-convertor includes a local oscillator and a mixer. To produce the spaced apart frequency bands described above, the local oscillator of each up-convertor outputs a unique frequency, $F_{LO,1}, F_{LO,2} \ldots F_{LO,n}$. For example, the mixer of the first up-convertor mixes the first RF signal with $F_{LO,1}$ to output a frequency band including ($F_1$), the mixer of the second up-convertor mixes the second RF signal with $F_{LO,2}$ to output a frequency band including ($F_2$), and so on.

For the present invention, the system further includes an optical receiver to convert the optical signal to an RF signal after the optical signal has travelled through the optical fiber. From the optical receiver, the RF signal is directed to an RF splitter which splits the RF signal into signal fractions and directs each signal fraction onto a respective circuit path. Each circuit path, in turn, includes a passband filter and a down-convertor. The passband filter removes frequencies outside of the sub-octave to reduce, and in some cases, eliminate second order distortions generated by the optical transmitter and introduced during transmission of the optical signal along the optical fiber. Furthermore, the passband filter can be used to pass only the desired frequency for subsequent down conversion.

Functionally, each down-convertor operates on a respective RF signal fraction from the splitter and outputs an RF signal having one of the transmitted digital signals encoded thereon. Typically, all of the RF signals output by the down-convertors have a common frequency, such as ($F_0$). For example, the first down-convertor operates on a first RF signal fraction to output an RF signal at frequency ($F_0$) that is modulated with the first digital signal, the second down-convertor operates on a second RF signal fraction to output an RF signal at frequency ($F_0$) that is modulated with the second digital signal, and so on. Each of the RF signals from the down-convertors can then be sent to a respective modem to demodulate the analog RF signals and output the transmitted digital signals. The recovered digital signals can then be transmitted over one or more networks to their respective destination address.

In an alternate embodiment, each down-convertor can include a circuit such as a tuning circuit and a local oscillator to recover one of the frequency bands that are modulated with one of the initial digital signals. For example, the first down-convertor recovers the first frequency band that is modulated with the first digital signal, the second down-convertor recovers the second frequency band that is modulated with the second digital signal etc. For this recovery, each down-convertor requires frequency and phase information regarding the local oscillator, $LO_1, LO_2 \ldots LO_n$ used to up-convert the initial RF signal on the transmit side of the optical fiber. Specifically, each down-convertor requires this information to drive its local oscillator. For example, the first down-convertor requires information regarding the corresponding up-convertor local oscillator, $LO_1$, to drive its local oscillator, $LO_1'$ during recovery of the first RF signal encoding the first digital signal.

For the above-described purposes, a reference local oscillator, $LO_{REF}$, producing a reference frequency, $F_{LO\text{-}REF}$, can be connected to each of the local oscillators $LO_{1 \ldots n}$, and used to generate the local oscillator signals in the up-convertors. With these connections, relative information between the reference local oscillator and the up-convertor local oscillators, including frequency and phase information, can be transmitted through the fiber. As envisioned for the present invention the output from the reference local oscillator can be sent with a telemetry signal that provides additional system information for operational use as needed. On the receive side, the reference local oscillator signal and telemetry signals can then be used to generate the local oscillator signals of the down-convertors during signal recovery.

Although the description above, for purposes of clarity, has described the transmission of digital signals in a first direction (i.e. forward direction) along an optical fiber, it is to be appreciated that the structures described herein may be provided on each side of the optical fiber to provide simultaneous digital signal transmission in the same fiber in both forward and reverse directions. For example, an optical signal having a wavelength, ($\lambda_1$) may be transmitted in a forward direction while an optical signal having a wavelength, ($\lambda_2$) is simultaneously transmitted in a reverse direction. It is also well known in the art that both forward and reverse transmissions (e.g. $\lambda_1$ and $\lambda_2$) can use multiple wavelengths, which can be combined to increase the total transmission capacity in each direction.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
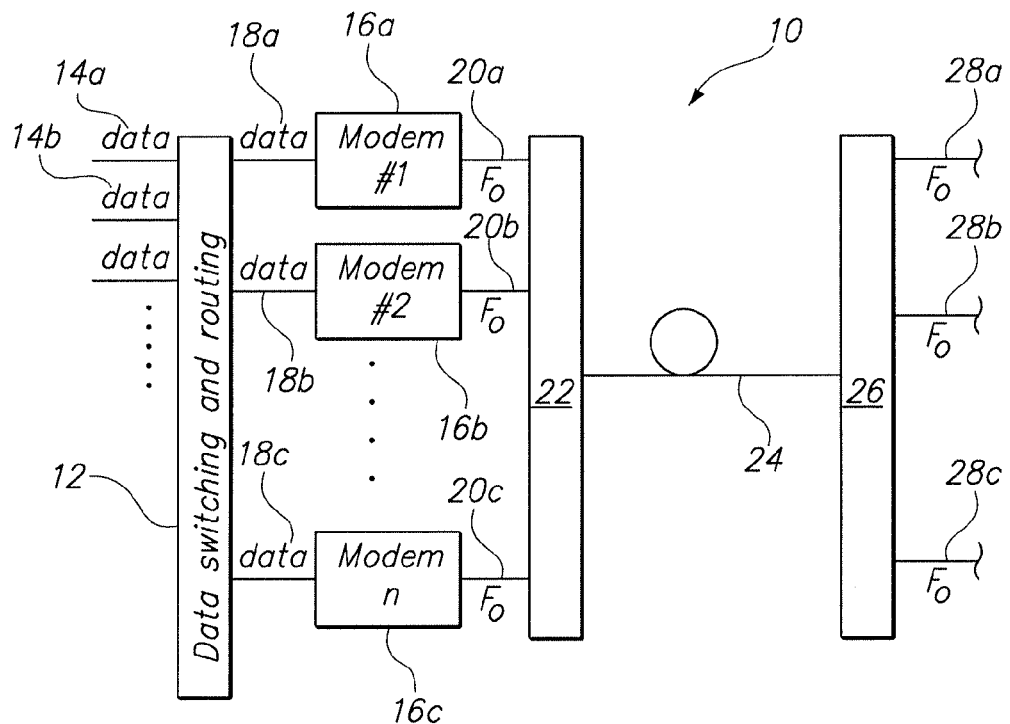
FIG. 1 is a schematic drawing showing a general overview of a transmission system in accordance with the present invention.

Referring initially to FIG. 1, a system for transporting digital signals is shown and is generally designated 10. As shown, the system 10 includes a data switching and routing unit 12 operationally connected to receive a plurality of digital data streams (of which data streams 14a and 14b are labeled) and route the received data streams 14a,b based on address information in the data stream 14a,b to an appropriate modem 16a-c. For the system 10, the data streams 14a,b can include, for example, audio and video signals or computer signals such as computer files or instructions and/or digital signals from other nodes in a communication network.

Continuing with FIG. 1, as shown, each modem 16a-c receives and operates on a respective routed data stream 18a-c and outputs a respective RF signal 20a-c having a carrier that is modulated by one of the routed data stream 18a-c. Typically, each RF signal that is output by a modem 16a-c has a frequency in the range of about 10 MHz to 1 GHz. For the system 10, the carrier frequencies of each modem 16a-c may differ, or, as shown, the carrier frequency, ($F_0$), of each modem 16a-c may be the same.

From the modems 16a-c, the RF signals 20a-c are processed and converted by a transmitter 22 which outputs an optical signal onto optical fiber 24. The structural and operational details of the transmitter 22 are described in more detail below with reference to FIG. 2. Continuing with FIG. 1, it can be seen a receiver 26 processes and converts the optical signal from the optical fiber 24 and outputs a plurality of RF signals 28a-c. The structural and operational details of the receiver 26 are described in more detail below with reference to FIG. 2. Typically, each RF signal 28a-c output by the receiver 26 has a frequency in the range of about 10 MHz to 1 GHz. For the system 10, the carrier frequencies of the RF signals 28a-c may differ, or, as shown, the carrier frequency, ($F_0$), of each RF signal 28a-c may be the same.

For the system 10 shown in FIG. 1, the RF signals 28a-c may be selectively routed to one or more networks. For example, these networks can include a Passive Optical Network (PON), an Ethernet Over Coaxial (EOC) network, and a Point-to-Point (P2P) network. Details including a schematic diagram of these types of networks are provided in U.S. patent application Ser. No. 13/045,250, titled "Sub-Octave RF Stacking for Optical Transport and De-Stacking for Distribution" filed Mar. 10, 2011, the entire contents of which are hereby incorporated by reference.

Figure 2:
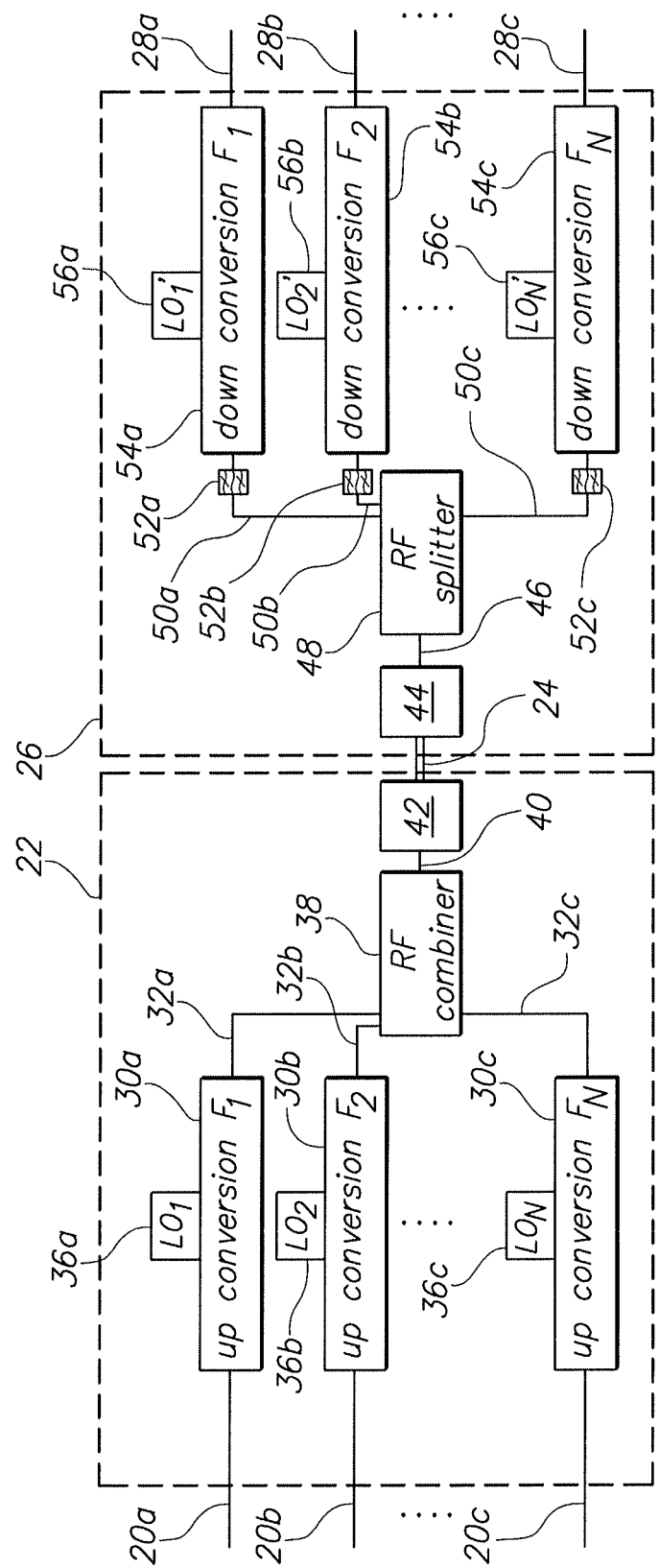
FIG. 2 is a schematic drawing showing the transmitter and receiver of FIG. 1 in greater detail for use with single sideband signals.

The details and operation of the transmitter 22 and receiver 26 can best be appreciated with reference to FIG. 2. As seen there, the transmitter 22 includes a plurality of up-convertors 30a-c, with each up-convertor 30a-c operating on a respective RF signal 20a-c to output an RF signal 32a-c having a frequency band that includes a frequency that is greater than the incoming RF signal 20a-c, e.g. ($F_O$). More specifically, as shown by cross referencing FIGS. 2 and 3, the first up-convertor 30a operates on a first RF signal 20a to output a frequency band that includes the frequency ($F_1$), the second up-convertor 30b operates on a second RF signal 20b to output a frequency band that includes the frequency ($F_2$), and so on, with the $n^{th}$ up-convertor 30c operating on an $n^{th}$ RF signal 20c to output a frequency band that includes the frequency ($F_n$).

As detailed further below, for the embodiment of the present invention shown in FIG. 2, each frequency band output by a respective up-convertor 30a-c is preferably a single sideband signal. In detail, the single sideband signal (either high side or low side) may be produced using a suitable filter or any other suitable method known in the pertinent art for producing a single sideband signal.

Figure 3:
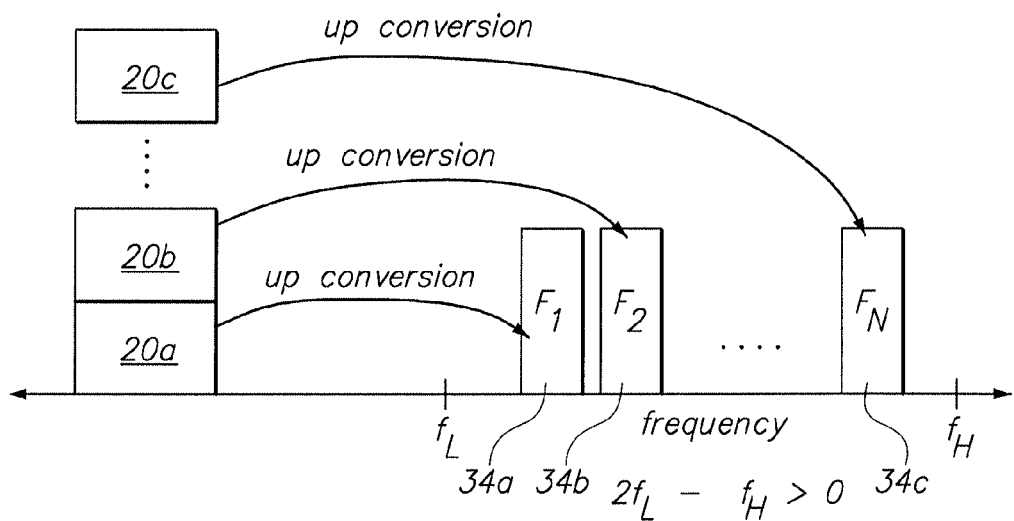
FIG. 3 is a frequency plot illustrating the up-conversion of a plurality of signals into frequency bands that are non-overlapping with each other and are spaced apart from each other within a single sub-octave.

Cross referencing FIGS. 2 and 3, it can be seen that the RF signals 20a-c are up-converted by the up-convertors 30a-c to respective frequency bands 34a-c that are non-overlapping and are spaced apart within a single sub-octave. Thus, all of the frequencies output by the up-convertors 30a-c reside within a frequency spectrum between $f_L$ and $f_H$, where $2f_L - f_H > 0$. For example, frequency bands may begin at a frequency of about 1,000 MHz, have a bandwidth of about 100 MHz and a spacing between bands of 4 MHz. In some instances, frequencies in the range of about 3 GHz, and above, may be used. In some cases, fiber optic transmission on a sub-octave bandwidth can reduce second order distortions by as much as 80%, or more.

To accomplish the above-described up-conversion, as shown in FIG. 2, each up-convertor 30a-c includes a local oscillator 36a-c and a mixer to mix the output of the local oscillator 36a-c with the incoming RF signal 20a-c. For the transmitter 22, each local oscillator 36a-c outputs a unique frequency and, as a consequence, each up-convertor 30a-c outputs a unique frequency band 34a-c that does not overlap with the other frequency bands 34a-c and is spaced apart from the other frequency bands 34a-c within a single sub-octave as shown in FIG. 3.

As best seen in FIG. 2, the RF signals 32a-c having respective frequency bands 34a-c that are output from the up-convertors 30a-c are input to an RF combiner 38 which combines the RF signals 32a-c into a combined signal 40 that is output onto a common conductor that is connected to an optical transmitter 42. At the optical transmitter 42, the combined signal 40 is converted into an optical signal, for example, having a wavelength ($\lambda_1$), that is directed onto an end of the optical fiber 24. For example, the optical transmitter 42 may include a laser diode and the optical fiber 24 may have a length greater than about 1 Km.

Continuing with FIG. 2, it can be seen that the receiver 26 includes an optical receiver 44 operationally connected to the optical fiber 24 to receive optical signals sent by the optical transmitter 42. For example, the optical receiver 44 may include a photodiode. As further shown in FIG. 2, the optical receiver 44 converts the optical signal from the optical fiber 24 to an RF signal 46 which is then directed to an RF splitter 48. At the RF splitter 48, the RF signal 46 is split into signal fractions 50a-c which are placed on respective circuit paths which include a respective passband filter 52a-c and a respective down-convertor 54a-c. For the system, the passband filters 52a-c remove frequencies outside of the sub-octave (i.e. frequency spectrum between $f_L$ and $f_H$) to reduce, and in some cases, eliminate second order distortions generated during transmission of the optical signal along the optical fiber 24. In some cases, a tuning circuit in the down-convertor 54a-c may function to filter some or all of the out-of band frequencies (i.e. frequencies outside the sub-octave).

Continuing with reference to FIG. 2, each down-convertor 54a-c operates on a respective RF signal fraction 50a-c from the RF splitter 48 and outputs an RF signal 28a-c having one of the transmitted digital signals encoded thereon. Typically, all of the RF signals 28a-c output by the down-convertors have a common frequency, such as ($F_O$). For example, the first down-convertor 54a operates on a first RF signal fraction 50a to output an RF signal 28a at frequency ($F_O$) that is modulated with the first digital signal, the second down-convertor 54b operates on a second RF signal fraction 50b to output an RF signal 28b at frequency ($F_O$) that is modulated with the second digital signal, and the $n^{th}$ down-convertor 54c operates on the $n^{th}$ RF signal fraction 50c to output an RF signal 28c at frequency ($F_O$) that is modulated with the $n^{th}$ digital signal. For the receiver 26, each down-convertor 54a-c can include a circuit such as a tuning circuit that is tuned to select one of the frequency bands 34a-c (see FIG. 3) and a local oscillator 56a-c producing a local oscillator output that is mixed with the selected frequency bands 34a-c. The output of each down-convertor 54a-c is an RF signal 28a-c that is modulated with one of the initial digital signals. Each of the RF signals 28a-c from the down-convertors 54a-c can then be sent to a respective modem (not shown) to demodulate the analog RF signals and output the transmitted digital signals. The recovered digital signals can then be transmitted over one or more networks to their respective destination address.

Figure 4:
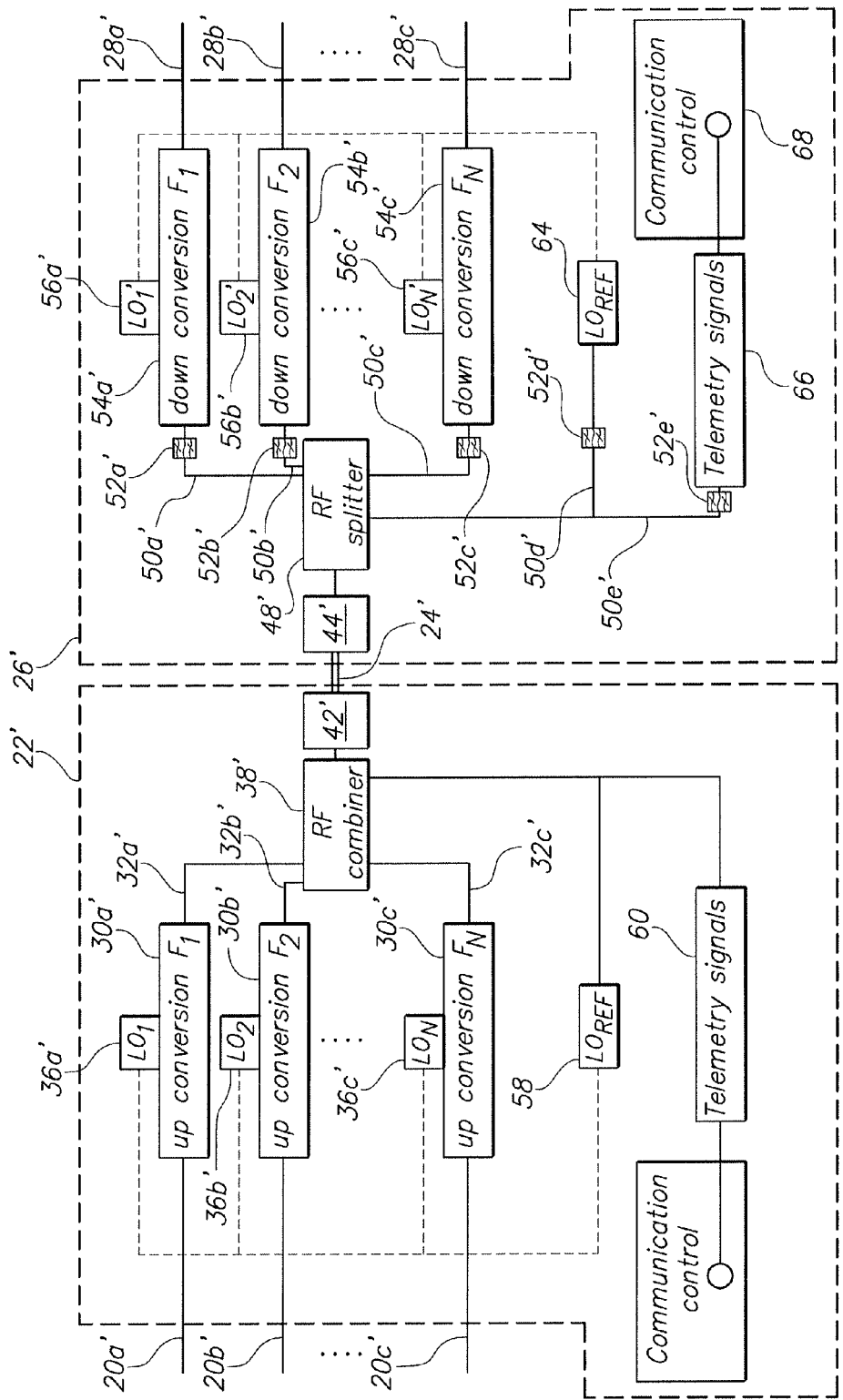
FIG. 4 is a schematic drawing showing another embodiment of a transmitter and receiver for use in the system of FIG. 1 for use with single sideband or double sideband.

FIG. 4 shows another embodiment having a transmitter 22' that includes a plurality of up-convertors 30a'-c', with each up-convertor 30a'-c' operating on a respective RF signal 20a'-c' to output an RF signal 32a'-c' having a frequency band that includes a frequency that is greater than the incoming RF signal 20a'-c', e.g. ($F_O$). For this embodiment, each frequency band output by a respective up-convertor 30a'-c' can include both sidebands (i.e. double sideband (DSB)), can include a vestigial sideband (VSB) signal or may include only a single sideband (SSB) of the modulated signal. As described above for the embodiment shown in FIG. 2, for this embodiment, the RF signals 20a'-c' are up-converted by the up-convertors 30a'-c' to respective frequency bands 34a-c (See FIG. 3) that are non-overlapping and are spaced apart within a single sub-octave. For this purpose, each up-convertor 30a'-c' includes a local oscillator 36a'-c' and a mixer. Also shown, a reference local oscillator 58, producing a reference frequency, $F_{LO-REF}$, is connected to each of the local oscillators 36a'-c', and used to generate the local oscillator signals in the up-convertors 30a'-c'. A respective mixer then mixes the output of a local oscillator 36a'-c' with a respective incoming RF signal 20a'-c' to produce the up-convertor 30a'-c' output.

With the connections between the local oscillator 36a'-c' and reference local oscillator 58, relative information between the reference local oscillator 58 and the up-convertor local oscillators 36a'-c', including frequency and/or phase information, can be controlled by reference local oscillator 58 using phase lock loop circuits, which reside in local oscillators 36a'-c'. Output from the reference local oscillator 58 and the telemetry signal 60 can be combined at the RF combiner 38' with the frequency bands from the up-convertors 30a'-c' and transmitted via optical transmitter 42' through the optical fiber 24'.

Continuing with FIG. 4, it can be seen that the receiver 26' includes an optical receiver 44' operationally connected to the optical fiber 24' to receive optical signals sent by the optical transmitter 42', convert the optical signal to an RF signal and direct the RF signal to an RF splitter 48'. At the RF splitter 48', the RF signal is split into signal fractions 50a'-e'. As shown, signal fractions 50a'-c' are placed on respective circuit paths which include a respective passband filter 52a'-c' and a respective down-convertor 54a'-c'. For the system, the passband filters 52a'-e' remove frequencies outside of the sub-octave (i.e. frequency spectrum between $f_L$ and $f_H$) to reduce, and in some cases, eliminate second order distortions generated by the optical transmitter 42' and introduced during transmission of the optical signal along the optical fiber 24'. In some cases, tuning circuits in the down-convertors 54a'-c' may function to filter some or all of the out-of-band frequencies (i.e. frequencies outside the sub-octave).

As further shown in FIG. 4, signal fraction 50d' is placed on a respective circuit path which include a respective passband filter 52d' and a reference local oscillator recovery unit 64 which recovers the reference local oscillator signal. For example, the reference local oscillator recovery unit 64 can include phase lock loop circuitry components such as phase detectors and Voltage Control Oscillators (VCO). Also shown, signal fraction 50e' is placed on a respective circuit path which includes a respective passband filter 52e' and a telemetry signal recovery unit 66 which recovers the telemetry signal. As shown, the reference local oscillator recovery unit 64 and telemetry signal recovery unit 66 are connected to a communication control unit 68 and the local oscillator 56a'-c' or each down-convertor 54a'-c'. With this arrangement, an appropriate local oscillator 56a'-c' signal can be generated using the recovered reference local oscillator signal (i.e. relative phase and/or frequency between the reference local oscillator signal and the corresponding up-convertor local oscillator). With the appropriate signal from the local oscillator 56a'-c', each respective down-convertor 54a'-c' operates on a respective RF signal fraction 50a'-c' from the RF splitter 48 and outputs an RF signal 28a'-c' having one of the transmitted digital signals encoded thereon.

Figure 5:
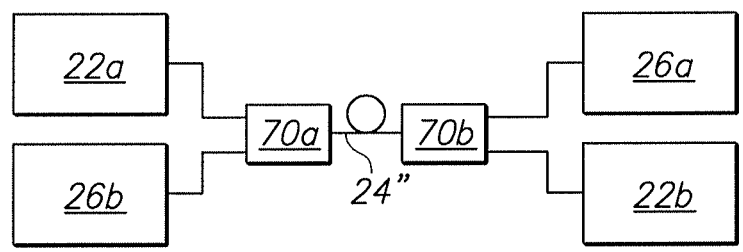
FIG. 5 is a schematic drawing illustrating that the systems and methods of the present invention can be used to simultaneous transport digital signals in the same fiber in both forward and reverse directions.

FIG. 5 shows that the structures described herein may be provided on each side of an optical fiber 24" to provide simultaneous digital signal transmission in the same optical fiber 24" in both forward and reverse directions. As shown a transmitter 22a (as described above with reference to transmitter 22 or 22') can be positioned to transmit an optical signal having a wavelength, ($\lambda_1$) in a forward direction through, in series, wavelength division multiplexer 70a, optical fiber 24" and wavelength division multiplexer 70b for receipt by receiver 26a (as described above with reference to receiver 26 or 26'). Also, as shown, a transmitter 22b (as described above with reference to transmitter 22 or 22') can be positioned to transmit an optical signal having a wavelength, ($\lambda_2$) in a reverse direction through, in series, wavelength division multiplexer 70b, fiber 24" and wavelength division multiplexer 70a for receipt by receiver 26b (as described above with reference to receiver 26 or 26'). It is to be appreciated that some of the components of transmitter 22a may be shared, integrated with or co-located with some of the components of receiver 26b. It is also to be appreciated that more wavelengths can be inserted in the forward direction and/or in the reverse direction to increase the total digital transmission capacity.

As described above, the systems described herein can be used to transport frequency bands across an optical fiber that may include both sidebands (i.e. double sideband (DSB)), can include a vestigial sideband (VSB) signal or may include only a single sideband (SSB) of the modulated signal. In some instances, it may be more desirable to use single sideband signals because they use less transmission bandwidth than DSB, eliminate image issues (see below) and potentially reduce clipping effects. In addition, variations in the Local Oscillator (i.e. carrier frequency) during a transmission have only a minimal adverse effect when single sideband signals are used. On the other hand, when double sideband signals are used, a problem may result in which there is a folding back of images, which occurs for a DSB signal in its recovery during a down-conversion. This can cause cancellation (i.e. introduce distortions) unless both frequency and phase are accurately recovered in the DSB signal. The embodiment shown in FIG. 4 provides a solution by establishing a local oscillator reference, $LO_{REF}$, that can be used to generate the local oscillator signals, $LO_N$, at the transmit end of the system. Both $LO_{REF}$ and $LO_N$ are then transmitted over the fiber optic to the receive end of the system where the $LO_{REF}$ is used to recover $LO_N'$ for down-conversion. The use of the $LO_{REF}$ approach can also be used to improve signal recover when single sideband signals are used.

While the particular System Using Frequency Conversions For Sub-Octave Transmission Of Signals Over A Fiber Optic as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A system for transporting a plurality of digital signals as a single optical signal on a single optical fiber to reduce second order distortions during optical transport, the system comprising:
    a plurality of modems for separately modulating a respective digital signal and outputting a respective RF signal;
    a plurality of up-convertors, each up-convertor electrically connected to a respective modem to receive an RF signal therefrom, and operating on the RF signal to create an output RF signal having a frequency band, wherein the frequency bands of the plurality of the output RF signals are non-overlapping with each other and spaced apart from each other within a single sub-octave frequency spectrum;
    an RF combiner for producing a combined RF signal from the frequency bands;
    an optical transmitter for converting the combined RF signal into the optical signal to be directed into the optical fiber;
    an optical receiver for converting the optical signal to a transmitted RF signal;
    an RF splitter for producing signal fractions from the transmitted RF signal; and
    a plurality of down-convertors, each down-convertor receiving a signal fraction from the splitter and outputting an RF signal having one of the digital signals encoded thereon.

2. A system as recited in claim 1 wherein the frequency bands of the output RF signals are selected from the group of bands consisting of a double sideband (DSB) and a single sideband (SSB) of the modulated signal.

3. A system as recited in claim 1 wherein the RF splitter directs each signal fraction onto a respective circuit path and the system further comprises a plurality of passband filters, each passband filter operationally interposed between the RF splitter and a respective down-convertor, each passband filter removing frequencies outside of the sub-octave frequency spectrum.

4. A system as recited in claim 1 wherein the optical transmitter converts the combined RF signal into an optical signal having a wavelength, ($\lambda_1$) directed into a first end of the optical fiber for transmission in a forward direction, and wherein the system further comprises:

a second plurality of up-convertors, each up-convertor in the second plurality operating on an RF signal modulated with a corresponding digital signal to output respective RF signals having respective frequency bands, the frequency bands being non-overlapping with each other and spaced apart from each other within a single sub-octave frequency spectrum;

a second RF combiner for producing a second combined RF signal from the frequency bands from the second plurality of up-convertors;

a second optical transmitter for converting the second combined RF signal into a second optical signal having a wavelength, ($\lambda_2$), with $\lambda_1 \neq \lambda_2$, directed into a second end of the optical fiber for transmission in a reverse direction;

a second optical receiver for converting the second optical signal to a second transmitted RF signal;

a second RF splitter for producing second signal fractions from the second transmitted RF signal; and a second plurality of down-convertors, each down-converter of the second plurality receiving a second signal fraction from the second RF splitter and outputting an RF signal having a digital signal encoded thereon.

5. A system as recited in claim 1 wherein each up-convertor includes an up-convertor local oscillator and a mixer and each up-convertor local oscillator produces an output frequency different from the other up-convertor local oscillators.

6. A system as recited in claim 5 wherein each down-convertor includes a down-convertor local oscillator.

7. A system as recited in claim 6 wherein each down-convertor local oscillator is driven using information regarding a corresponding up-convertor local oscillator.

8. A system as recited in claim 7 further comprising a reference local oscillator, producing a reference frequency signal.

9. A system as recited in claim 8 further comprising a phase lock loop circuit in each up-converter local oscillator to establish frequency and phase relationships with the reference frequency signal.

10. A system as recited in claim 9 wherein the reference frequency signal and a telemetry signal are combined with the frequency bands from the up-convertors by the RF combiner and converted to an optical signal by the optical transmitter.

11. A system as recited in claim 10 wherein the transmitted optical signal is received by an optical receiver, and wherein the reference frequency signal is used with a phase lock loop circuit, at each down-convertor to recover the RF signal.

12. A system for transmitting a plurality of digital signals as a single optical signal on a single optical fiber to reduce second order distortions during optical transport, the system comprising:

a plurality of modems for separately modulating a respective digital signal and outputting a respective RF signal;

a plurality of up-convertors, each up-convertor electrically connected to a respective modem to receive an RF signal therefrom, and operating on the RF signal to create an output RF signal having a frequency band, wherein the frequency bands of the plurality of the output RF signals are non-overlapping with each other and spaced apart from each other within a single sub-octave frequency spectrum;

an RF combiner for producing a combined RF signal from the frequency bands; and an optical transmitter for converting the combined RF signal into the optical signal to be directed into the optical fiber.

13. A system as recited in claim 12 further comprising a filter for signal filtration within said system to produce frequency bands as single sidebands (SSB) of the modulated signal.

14. A system as recited in claim 12 wherein each up-convertor includes an up-convertor local oscillator producing an output frequency different from the other up-convertor local oscillators.

15. A system as recited in claim 12 further comprising a reference local oscillator, producing a reference frequency signal.

16. A system as recited in claim 12 further comprising a telemetry subsystem for encoding information onto a telemetry signal, wherein the information provides monitoring and operational control of the system.

17. A system as recited in claim 12 further comprising:
an oscillator for generating a reference signal; and
a phase lock loop circuit in each up-converter to establish frequency and phase relationships with the reference signal.

18. A system as recited in claim 17 further comprising a phase lock loop circuit in each down-converter for using the reference signal to recover the RF signal.

19. A method for transporting a plurality of digital signals as a single optical signal on a single optical fiber to reduce second order distortions during optical transport, the method comprising the steps of:

modulating each digital signal and outputting a respective RF signal;

electrically transferring each RF signal to an up-converter;

up-converting each RF signal to output respective RF signals having respective frequency bands, the frequency bands being non-overlapping with each other and spaced apart from each other within a single sub-octave frequency spectrum;

combining the frequency bands to produce a combined RF signal;

converting the combined RF signal into the optical signal to be directed into the optical fiber;

converting the optical signal to a transmitted RF signal;

splitting the transmitted RF signal into signal fractions; and down-converting at least one signal fraction from the splitter and outputting an RF signal having at least one of the digital signals encoded thereon.

20. A method as recited in claim 19 further comprising the step of filtering a signal to produce frequency bands as single sidebands (SSB) of the modulated signal.

* * * * *